No. 710,326. Patented Sept. 30, 1902.
G. H. KINKADE & L. MAGER.
KRAUT CUTTER.
(Application filed Apr. 22, 1902.)
(No Model.)
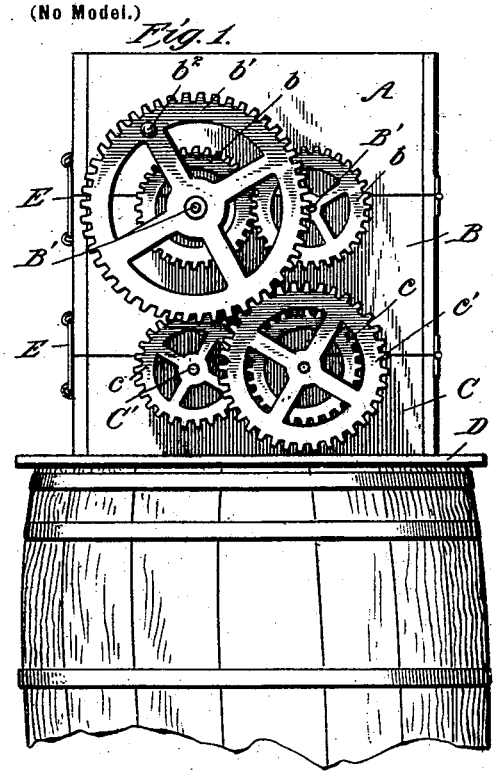
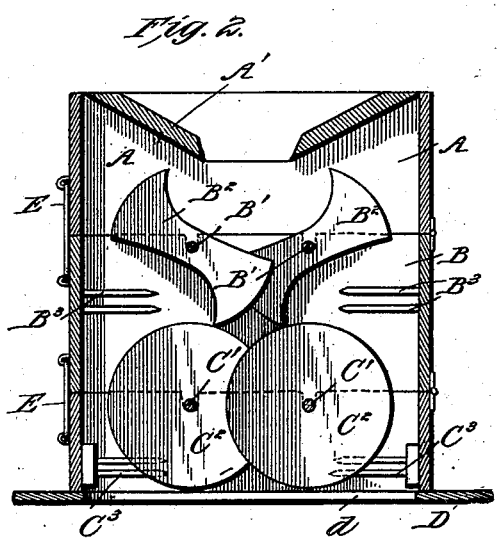
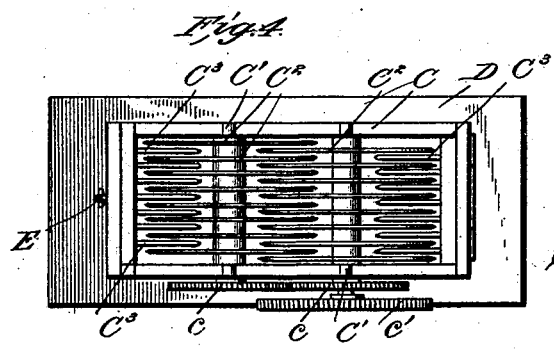
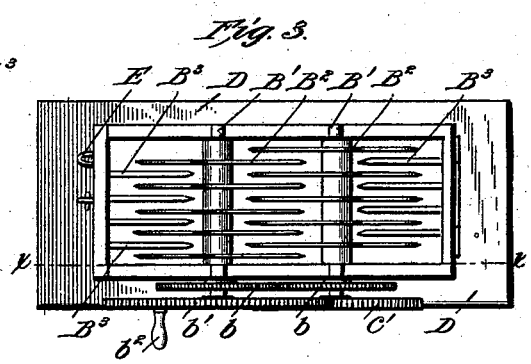
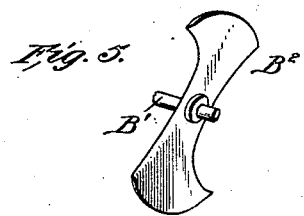
WITNESSES:
INVENTORS:
Geo. H. Kinkade.
Louis Mager.
BY
ATTORNEYS

UNITED STATES PATENT OFFICE.

GEORGE H. KINKADE AND LOUIS MAGER, OF HARDIN, ILLINOIS.

KRAUT-CUTTER.

SPECIFICATION forming part of Letters Patent No. 710,326, dated September 30, 1902.

Application filed April 22, 1902. Serial No. 104,101. (No model.)

*To all whom it may concern:*

Be it known that we, GEORGE H. KINKADE and LOUIS MAGER, of Hardin, in the county of Calhoun and State of Illinois, have invented a new and useful Improvement in Kraut-Cutters, of which the following is a specification.

Our invention relates to an improvement in kraut-cutters, and has for its object to provide a simple and efficient device which will cut cabbage into thin strings or kraut.

Our invention consists in the peculiar construction, operation, and combination of parts, as will be hereinafter fully described, and pointed out in the claims, reference being had to the accompanying drawings, forming part of this application, in which—

Figure 1 is a side elevation showing the driving mechanism. Fig. 2 is a section showing one of the sides removed. Fig. 3 is a plan view of the drawing-knife-carrying section. Fig. 4 is a similar view of the circular-knife-carrying section. Fig. 5 is a detached perspective view of one of the drawing-knives.

In carrying out our invention we provide a suitable receptacle or framework for the cutting mechanism, consisting of three or more hinged sections A B C, as shown in the drawings.

The upper section A is the hopper or feed section and is hinged at one end to one end of the upper portion of the second section B. Said section B consists of a box-like receptacle having its upper and lower ends open to allow a free passage of the cabbage through to lower section C. The upper surface of the side walls of the section B are provided with curved notches to form bearings for the shafts B' B', to which are rigidly secured at suitable intervals the drawing and cutting knives B² B² of the particular shape shown. Each of the said drawing and cutting knives is formed with the inwardly-curved edges arranged diametrically opposite each other, the purpose of which will presently appear. Secured to the end walls at a point somewhat below the plane of the shafts of the drawing-knives are the clearing fingers or bars B³, which project toward the center of the section B between the series of drawing and cutting knives, the purpose of said fingers or bars being to strip or clean from the drawing and cutting knives any pieces of cabbage that may adhere to the said knives, and thus prevent said pieces from being carried upwardly with the knives during their rotation. Secured to the shafts B' B' outside of the section B are the gear-wheels $b$ $b$, which mesh with each other, and on the end of one of the shafts is secured the large gear-wheel $b'$, which is provided with the crank-handle $b^2$ for turning said gear-wheel $b'$.

The section B is hinged at one end to the upper portion of one end of the section C, and said section C is provided on the upper edges of its side walls with the curved notches to form bearings for the shafts C' C', to which are rigidly secured the series of circular cutting-knives $C^2$ $C^2$, the knives on one shaft overlapping and passing between the circular knives on the other shaft, the said circular knives being placed somewhat closer together than the drawing-knives of the section above. On the shafts C' C' outside of the side wall of the section C are rigidly secured the gear-wheels $c$ $c$, which mesh with each other. These gear-wheels are secured to the shafts C' C' on the same side of the machine as the gear-wheels $b$ $b$ of the section B above. Secured to the outer end of one of the shafts $c$ is the larger gear-wheel $c'$, which meshes with the large gear $b'$ of the section B, the shaft C', carrying the large gear-wheel $c'$, being diagonally opposite the shaft carrying large gear $b'$ of the section B above.

Secured to the inner faces of ends of the section C are the clearing fingers or bars $C^3$, which project inwardly toward the center of said section between the series of rotary knives $C^2$, the purpose of said fingers or bars being to strip or clear any portions of the cabbage that may cling to said rotary knives.

Secured to the lower face of the section C is the base-piece D, provided with the central opening $d$, of substantially the size of the inside area of the section C. The base-piece D is sufficiently large to rest upon a barrel or other receptacle in which it is desired to gather the kraut when finally cut.

The various sections are provided at one end with suitable latches E, whereby the various sections may be fastened securely in their proper relation to one another and whereby they may be readily unfastened and thrown back to permit of the ready removal of the shafts B' B' and C' C' to more thoroughly clean the knives carried thereby or to permit of the repair of said knives or shafts.

In place of the crank-handle $b^2$ a band-pulley (not shown) may be attached to gear-wheel $b'$ to receive a belt driven by a suitable motor when the kraut-cutter is to be used in factories or large establishments.

The operation of our device is as follows: The cabbage is fed into the hopper A and passing into the section B is caught by the hook-shaped drawing and cutting knives $B^2$ $B^2$, the shafts being suitably rotated toward each other, and drawn into said section B, and after being partly cut by the said drawing-knives passes downwardly into the section C, where it is caught by the series of rotary knives therein and cut into thin strings suitable for kraut and drop into a suitable receptacle placed under the frame, the fingers or clearer-bars, as before stated, preventing any particles from clinging to the respective knives and being carried upwardly by the rotation of the knives.

It will be seen that we provide a simple and efficient device for cutting kraut and one which can be readily cleaned and repaired, and being composed of few parts is not likely to get out of order.

The clearing fingers or bars $B^3$ and $C^3$ are arranged in two horizontal rows, the fingers of the two rows being arranged in alternating relation. The fingers or bars $C^3$ may be secured to blocks or cleats secured to the inner faces of the ends of section C.

The drawing and cutting knives $B^2$ $B^2$, the working edges of which are sharpened, perform the double function of drawing the cabbage inwardly and downwardly and also of cutting the same.

Having thus described our invention, what we claim as new, and desire to secure by Letters Patent, is—

1. A kraut-cutter comprising a plurality of sections, one of said sections being provided with oppositely-rotating drawing and cutting knives, one or more sections provided with oppositely-rotating circular cutting-knives, and means for rotating said knives.

2. A kraut-cutter comprising a frame provided with a hopper, a series of oppositely-rotating hook-shaped drawing and cutting knives, a series of circular cutting-knives arranged below the said drawing-knives and means for simultaneously rotating both series of knives.

3. A kraut-cutter comprising a frame consisting of a plurality of hinged sections, one of said sections supporting a pair of removable shafts carrying a series of hook-shaped drawing-knives, one or more of said sections below the drawing-knife section supporting a pair of removable shafts carrying a series of circular cutting-knives, clearing fingers or bars secured to the ends of the said sections, and projecting between the series of knives of each section, and means for imparting a rotary motion to the respective shafts.

4. A kraut-cutter comprising a frame consisting of a plurality of hinged sections, one of said sections carrying a hopper, a second section below said hopper-section carrying a pair of oppositely-rotating shafts provided with a series of oppositely-arranged hook-shaped drawing-knives, a section below said drawing-knife section, carrying a pair of oppositely-rotating shafts provided with a series of circular cutting-knives, each of said knife-carrying sections being provided with clearing fingers or bars projecting between the series of knives, a horizontally-projecting base secured to the lower section, and provided with a central opening, and means for simultaneously rotating each pair of shafts in the knife-carrying sections toward each other.

5. A kraut-cutter comprising a frame consisting of a plurality of sections, one section carrying a pair of shafts provided with a series of overlapping hook-shaped drawing and cutting knives having their working edges reversely curved, a section below said drawing-knife section, carrying a pair of shafts provided with a series of overlapping circular cutting-knives, the circular knives being set on the shafts in closer relation than the series of drawing-knives, and means for rotating each pair of shafts toward each other simultaneously.

GEORGE H. KINKADE.
LOUIS MAGER.

Witnesses:
CHAS. E. COOKE,
CHAS. FLAMM.